(12) United States Patent
Slawinski et al.

(10) Patent No.: US 6,805,155 B2
(45) Date of Patent: Oct. 19, 2004

(54) CARTRIDGE RELIEF VALVE WITH IMPROVED STABILITY

(75) Inventors: Tomasz Slawinski, Northbrook, IL (US); Jianping Chen, Gurnee, IL (US)

(73) Assignee: HydraForce, Inc., Lincolnshire, IL (US)

( * ) Notice: Subject to any disclaimer, the term of this patent is extended or adjusted under 35 U.S.C. 154(b) by 0 days.

(21) Appl. No.: 10/292,867

(22) Filed: Nov. 12, 2002

(65) Prior Publication Data

US 2003/0094201 A1 May 22, 2003

Related U.S. Application Data (60) Provisional application No. 60/333,086, filed on Nov. 16, 2001.

(51) Int. Cl.[7] ............................................. F16K 17/00
(52) U.S. Cl. .................... 137/491; 137/489; 137/493.7; 251/35
(58) Field of Search ................... 137/489, 491, 137/493, 493.7, 500; 251/35

(56) References Cited

U.S. PATENT DOCUMENTS

| | | | | |
|---|---|---|---|---|
| 2,989,072 A | * | 6/1961 | Banker | 137/491 |
| 3,164,166 A | * | 1/1965 | Tennis | 137/491 |
| 3,330,298 A | * | 7/1967 | Allen | 137/491 |
| 3,608,576 A | | 9/1971 | Wilhelm | |
| 4,351,356 A | | 9/1982 | Koiwai et al. | |
| 4,597,410 A | * | 7/1986 | Wilke | 137/491 |
| 5,072,752 A | * | 12/1991 | Kolchinsky | 137/493 |
| 5,769,113 A | | 6/1998 | Alberts et al. | |

FOREIGN PATENT DOCUMENTS

| | | |
|---|---|---|
| EP | 1009494 | 11/1965 |
| EP | 56113867 | 9/1981 |

* cited by examiner

Primary Examiner—David A. Scherbel
Assistant Examiner—Ramesh Krishnamurthy
(74) Attorney, Agent, or Firm—Leydig, Voit & Mayer, Ltd.

(57) ABSTRACT

A cartridge relief valve uses a piston design. The piston replaces a tube used in prior art relief valves. The piston makes the inventive relief valve easier to manufacture and more stable than prior art relief valves. This is due to the fact that, for a given size valve, the diameter of the piston is smaller than the diameter of the tube that it replaces. Furthermore, the diameter of the pilot seat of the inventive relief valve is also smaller than the diameter of the pilot seat of many prior art valves.

2 Claims, 9 Drawing Sheets

CARTRIDGE RELIEF VALVE WITH IMPROVED STABILITY

CROSS-REFERENCE TO RELATED APPLICATIONS

This application claims the benefit of the filing date of U.S. Provisional Application No. 60/333,086, filed on Nov. 16, 2001.

TECHNICAL FIELD

The invention relates generally to relief valves, and, more particularly, to cartridge relief valves that have a built-in reverse flow check valve structure.

BACKGROUND

Relief valves are generally used to limit the maximum pressure in fluid systems. There are a variety of relief valves available on the market today. However, valve manufacturers are constantly seeking ways to improve the performance of such valves and to lower the amount of money and time it takes to manufacture them.

BRIEF DISCRIPTION OF THE DRAWINGS

While the appended claims set forth the features of the present invention with particularity, the invention may be best understood from the following detailed description taken in conjunction with the accompanying drawings of which:

DETAILED DESCRIPTION

The invention is generally directed to a cartridge relief valve having a piston design that makes the relief valve easier to manufacture and more stable than prior art relief valves.

Figure 1:
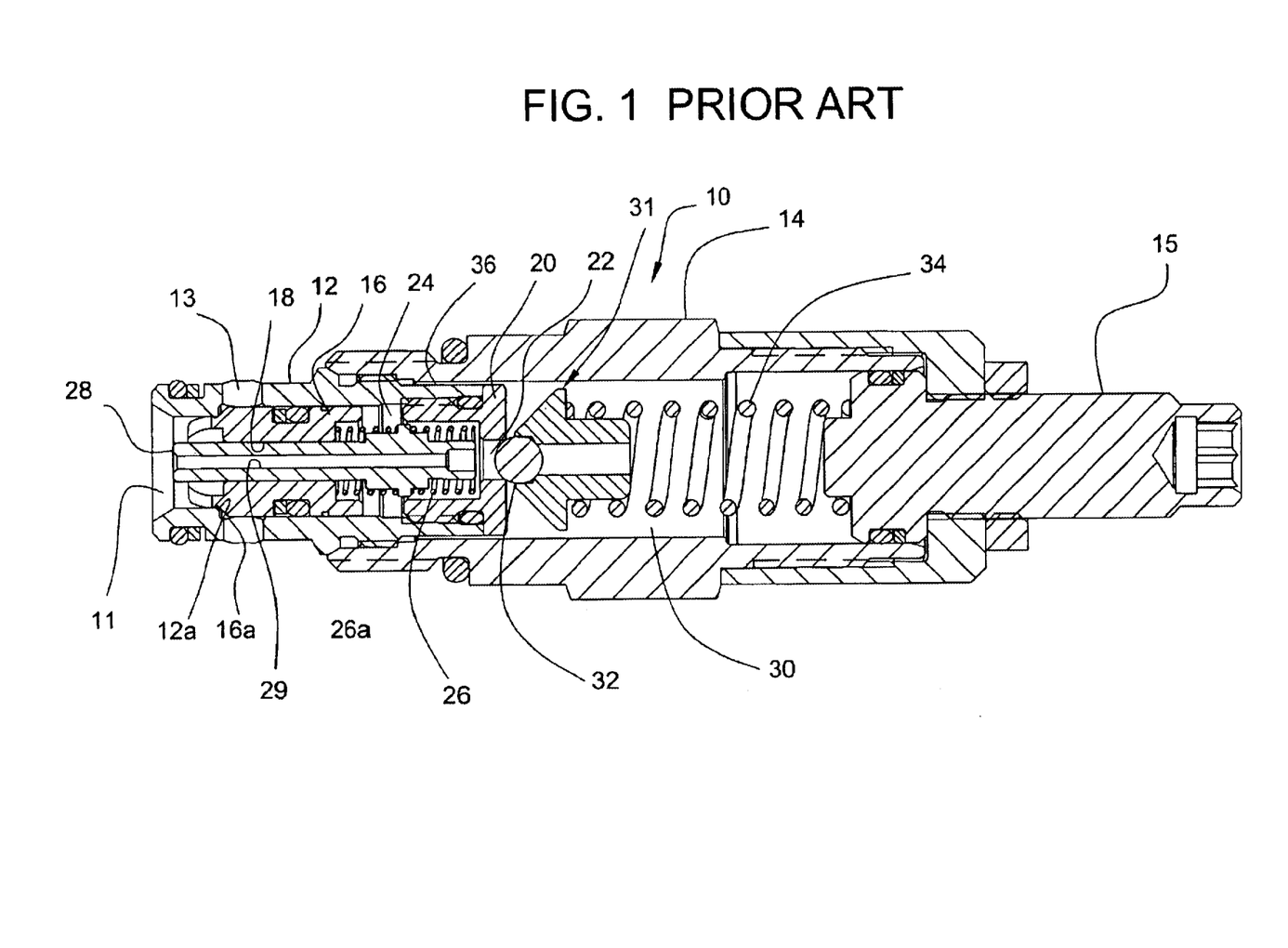
FIG. 1 illustrates a prior art cartridge relief valve.

Referring to FIG. 1, an example of a prior art relief valve will now be described. The relief valve 10 includes a generally cylindrical cage 12, a generally cylindrical adapter 14 and an adjuster 15. The cage 12 is coupled to one end of the adapter 14, while the adjuster 15 is coupled to the other end of the adapter 14. The relief valve 10 has a first port 11 and a second port 13, which are defined in the cage 12. The cage 12 has a sloped surface 12a near the second port 13, which is referred to herein as a seat 12a. Slideably disposed inside the cage 12 is a main poppet 16 having an axial bore 18. The main poppet 16 has a sloped face 16a. In the position depicted in FIG. 1, the poppet face 16a contacts the seat 12a of the cage 12 to form a metal seal that blocks communication between the first port 11 and the second port 13. A pilot seat 20 is disposed adjacent to the main poppet 16 and is fixed within the cage 12. The pilot seat 20 has an orifice 22. A first chamber 24 is defined between the pilot seat 20 and the main poppet 16. A tube 28 is slideably disposed within the axial bore 18 of the main poppet 16. In the position shown in FIG. 1, the tube 28 extends partially out of the main poppet 16 near the first port 11 at one end and partially into the chamber 24 at the other end. The tube 28 has an axial bore 29 that communicates with the chamber 24 when the tube 28 is in the position shown in FIG. 1. Located within the first chamber 24 are a main spring 26 and a support spring 26a. The main spring 26 is in contact with the tube 28 at one end and with the pilot seat 20 at the other end. The support spring 26a is in contact with the tube 28 at one end and with the main poppet 16 at the other end. The main spring 26 and the support spring 26a keep the tube 28 in a free floating position with one end of the tube 28 facing away from the pilot seat 20.

Referring again to FIG. 1, the relief valve 10 further includes a second chamber 30 defined in the adapter 14 between the adjuster 15 and the pilot seat 20. A pilot poppet 31 is slideably disposed in the second chamber 30. The pilot poppet 31 has a ball seal 32. A pilot spring 34 is disposed in the second chamber 30, and is in contact with both the pilot poppet 31 and the adjuster 15. The spring 34 biases the pilot poppet 31 toward the orifice 22 of the pilot seat 20, so that, when the fluid pressure at the orifice is less than the force provided by the pilot spring 34, the ball seal 32 abuts the orifice 22. The adjuster 15 can be adjusted to move closer or farther away from the pilot poppet 31, thereby increasing or decreasing the biasing force of the pilot spring 34. The dimensions of the ball seal 32 are appropriate for preventing the flow of fluid through the orifice 22. A passageway 36 is defined between the inner surface of the adapter 14 and the outer surface of the cage 12, and provides communication between the second chamber 30 and the second port 13.

The relief valve 10 of FIG. 1 is designed to limit the pressure difference between the first port 11 and the second port 13, and to permit fluid to flow freely from the second port 13 to the first port 11. Under normal working conditions, fluid from the first port 11 flows through the axial bore 29 of the tube 28 and into the first chamber 24. until the pressure of the fluid in the first chamber 24 equals the pressure of the fluid at the first port 11. When the pressure of the fluid in the first chamber 24 exceeds the pressure value set by the biasing force of the pilot spring 34, the fluid pushes the pilot poppet 30 away from the orifice 22 of the pilot seat 20, exits the first chamber 24 and enters the second chamber 30. Fluid also flows through the axial bore 29 of the tube 28 and into the second chamber 30. Finally, the fluid in the second chamber 30 travels through the passageway 36 and out of the second port 13. The flow of fluid out of the chamber 24 causes the pressure in the chamber 24 to drop, which causes the tube 29 to move against the main spring 26 and toward the orifice 22 of the pilot seat 20, until it moves through the orifice 22 of the pilot seat 20 and abuts the ball seal 32 of the pilot poppet 30, at which point the ball seal 32 restricts the flow of the fluid through the axial bore 29 of the tube 28. This action forms two flow restrictions—one between the tube 28 and the pilot poppet 31 and another between the tube 28 and the rim of the orifice 22. When the force created by pressure of the fluid in the first chamber 24 is lower than the force created by the pressure of the fluid at the first port 11, then the main poppet 16 moves away from the seat 12a of the cage 12, thereby opening a flow path between the first port 11 and the second port 13.

The relief valve 10 of FIG. 1 also has a reverse flow mode. In the reverse flow mode, when the fluid pressure at the second port 13 exceeds the fluid pressure at the first port 11, the pressure difference causes the main poppet 16 to move away from the first port 11. This action results from the geometry of the main poppet 16, and, in particular, the fact that a small, slanted portion 16a of the main poppet 16 is exposed to the second port 13. When the main poppet 16 moves away from the first port 11, fluid is permitted to flow directly from the second port 13 to the first port 11. Furthermore, the movement of the main poppet 16 away from the first port 11 compresses the fluid in the first chamber 24, thereby forcing the fluid from the first chamber 24, through the axial bore 29 of the tube 28, and out of the first port 11.

Figure 2:
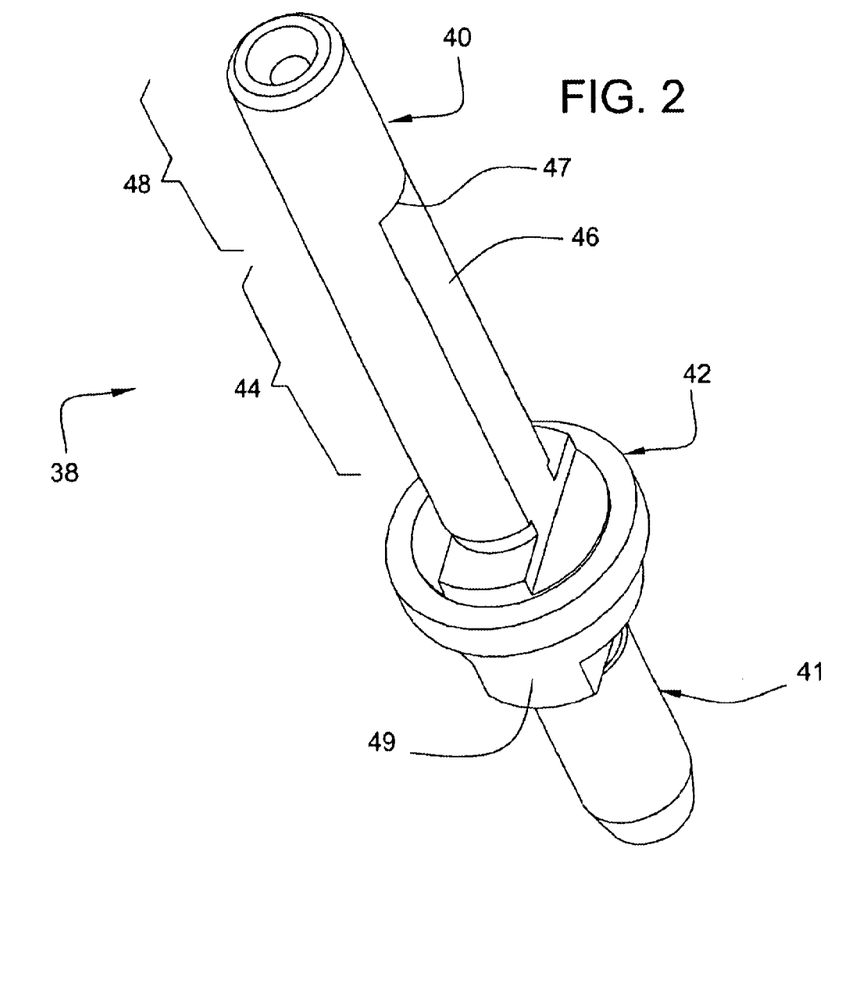
FIG. 2 illustrates a piston according to an embodiment of the invention.
Figure 3:
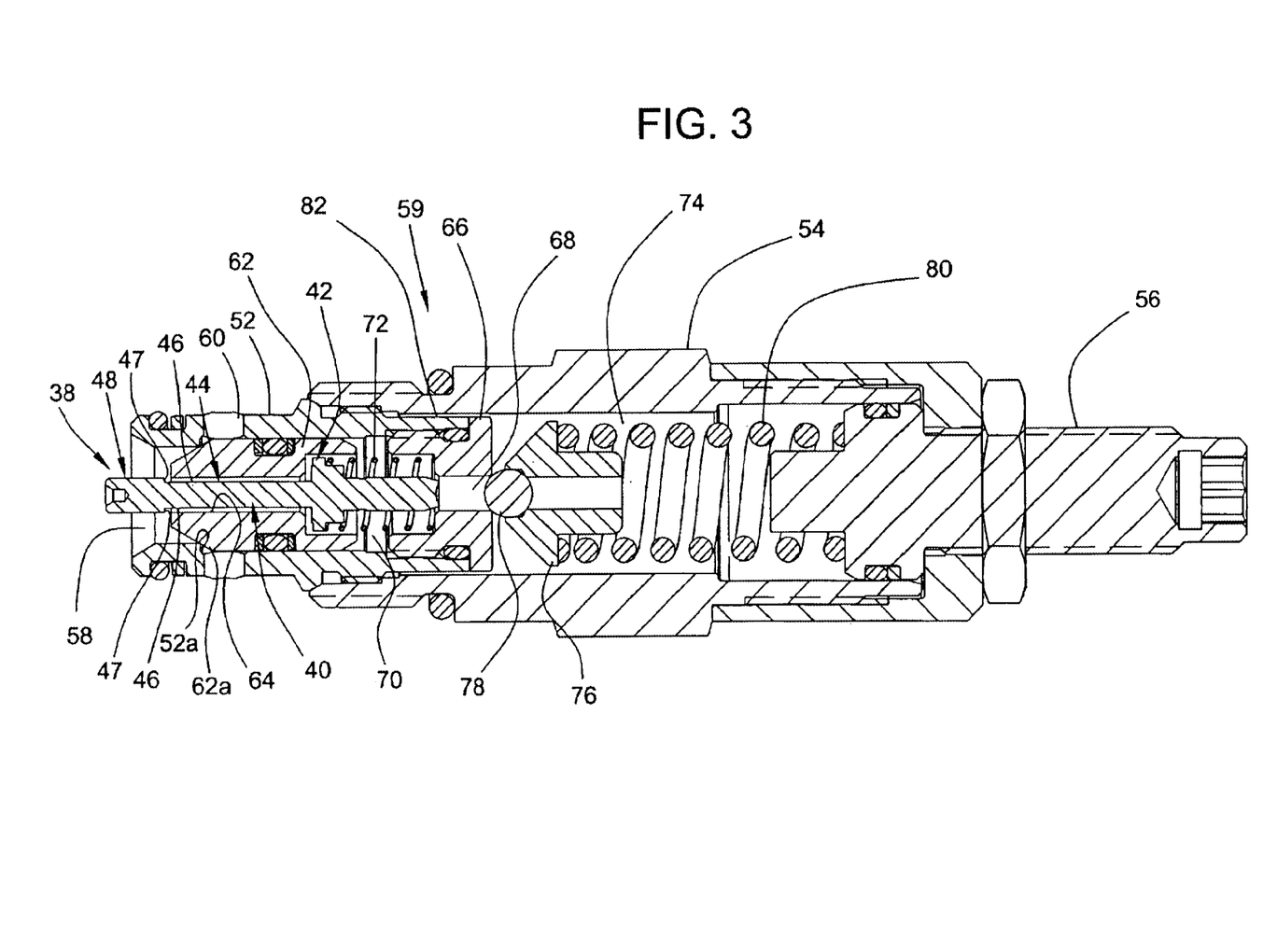
FIGS. 3-7 illustrate a relief valve in accordance with an embodiment of the invention, with FIG. 5 further illustrating the relief valve in reverse flow mode.
Figure 4:
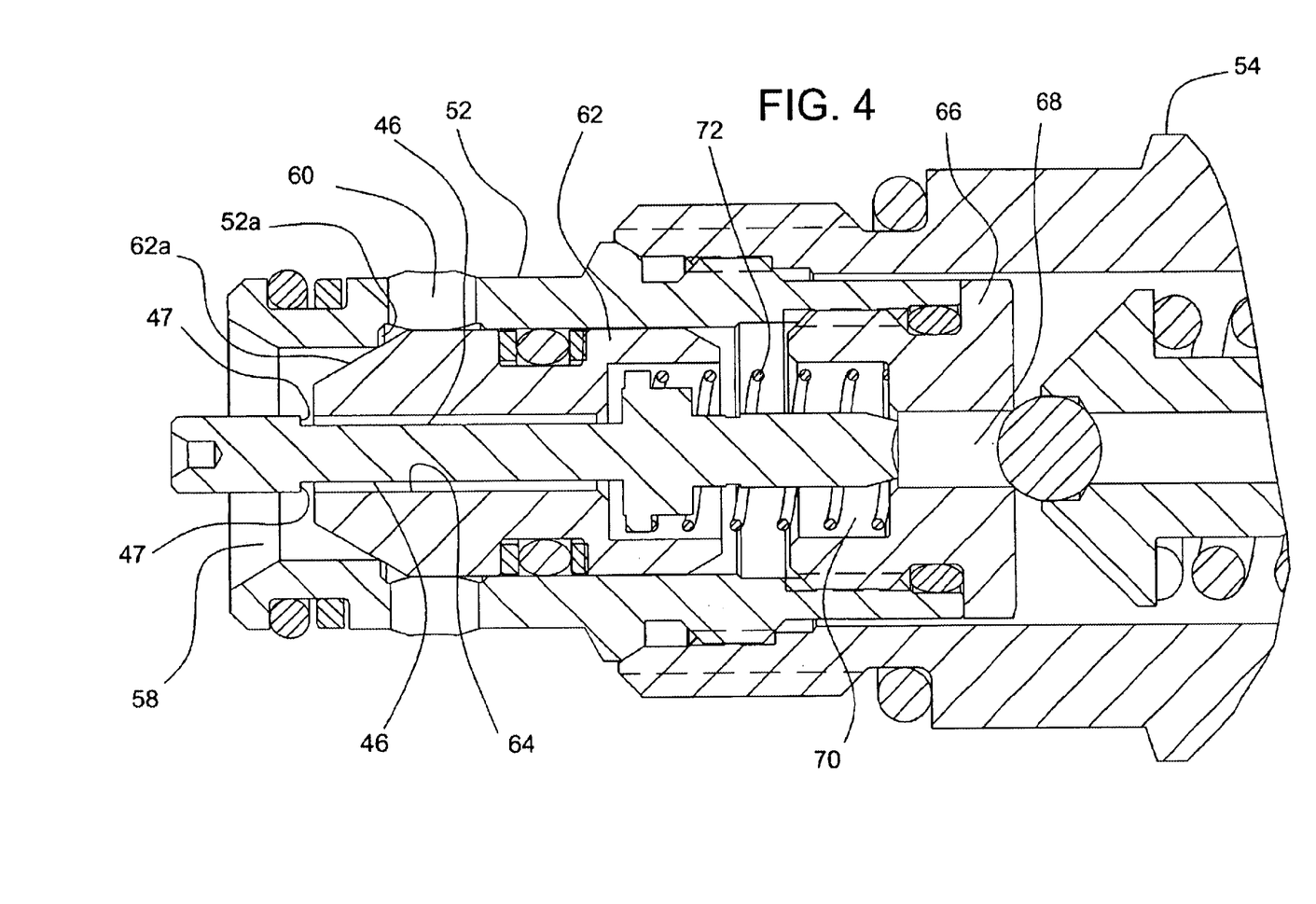
Figure 5:
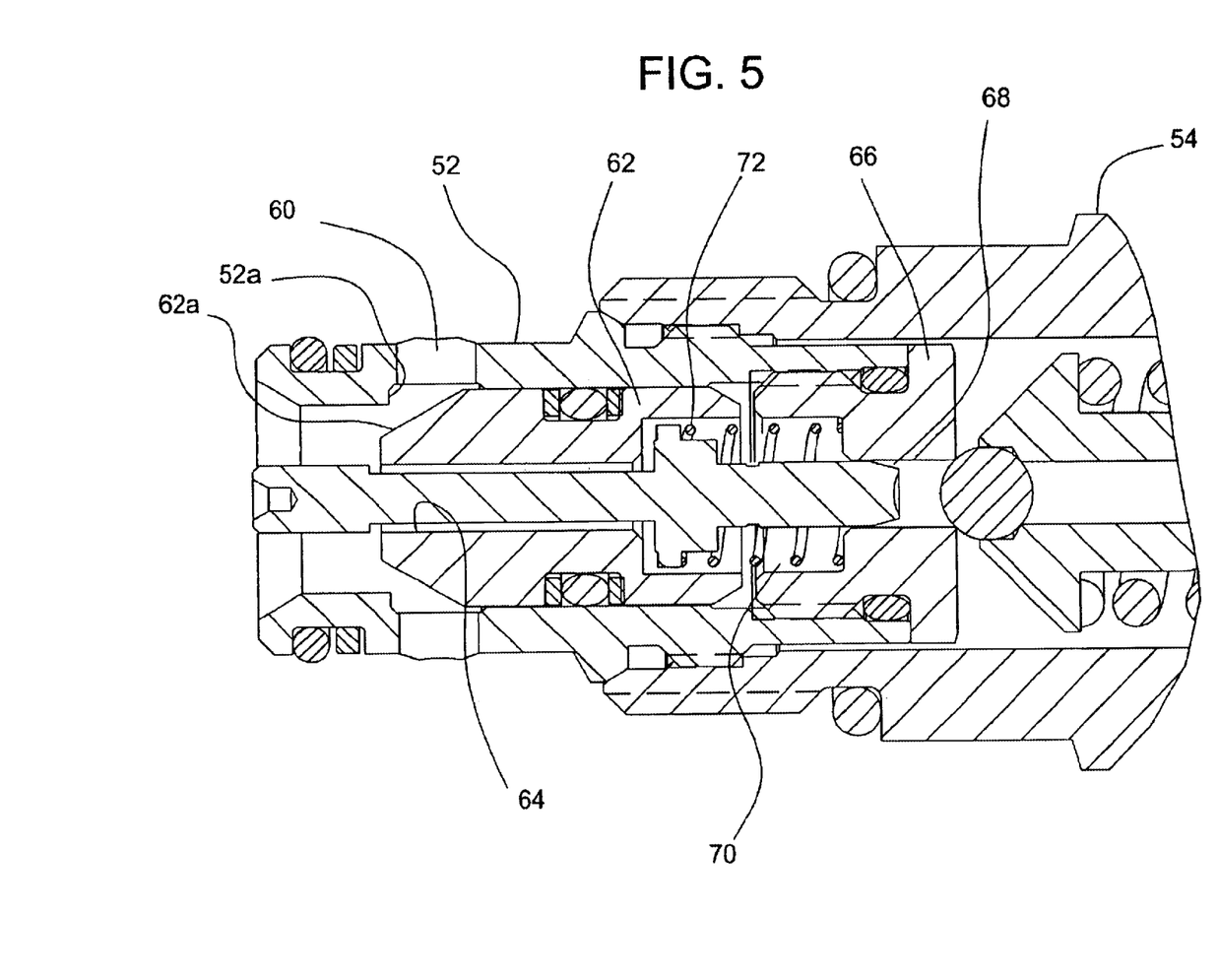

Referring to FIG. 2, a piston that functions according to an embodiment of the invention will now be described. The piston 38 has a first stem 40, a second stem 41 and a head 42 disposed between the first and second stems. The head 42 includes a step 49. The first stem 40 includes a slotted portion 44 having a pair of slots 46. Each of the pair of slots 46 has a leading edge 47. The first stem 40 also includes a non-slotted portion 48. In FIG. 2, only one of the pair of slots 46 is visible, but both slots 46 can be seen in FIGS. 3-7, in which a relief valve 50 that incorporates the piston 38 is shown. The relief valve 50 has many of the same components as the relief valve 10 of FIG. 1. For example, the relief valve 50 includes a generally cylindrical cage 52, a generally cylindrical adapter 54 and an adjuster 56. The cage 52 is coupled to one end of the adapter 54, while the adjuster 56 is coupled to the other end of the adapter 54. The relief valve 50 has a first port 58 and a second port 60, which are defined in the cage 52. The cage 52 has a sloped surface 52a near the second port 60. Slideably disposed inside the cage 52 is a main poppet 62 having an axial bore 64. The main poppet 62 has a sloped face 62a. In the position depicted in FIGS. 3 and 4, the main poppet face 62a contacts the seat 52a of the cage 52 to form a metal seal that blocks communication between the first port 58 and the second port 60. A pilot seat 66 is disposed adjacent to the main poppet 62 and is fixed within the cage 52. The pilot seat 66 has an orifice 68. A first chamber 70 is defined between the pilot seat 66 and the main poppet 62. Located within the first chamber 70 is a main spring 72. The piston 38 is slideably disposed within the axial bore 64 of the main poppet 62, with the head 42 of the piston 38 being disposed in the first chamber 70. In FIGS. 3 and 4, the piston 38 is shown in a first position, in which all of the non-slotted portion 48 of the first stem 40, and at least part of the slotted portion 44 extend partially out of the axial bore 64 of the main poppet 62 near the first port 58. In FIG. 4, the piston 38 is shown in a second position, in which all of the slotted portion 44 of the first stem 40 is inside the axial bore 64 of the main poppet 62, and in which at least part of the non-slotted portion 48 is also inside the axial bore 64 of the main poppet 62. The main spring 72 is in contact with the head 42 and is disposed around the step 49 (from FIG. 2). The main spring 72 is also in contact with the pilot seat 66. The main spring 72 exerts a force to bias the piston 38 toward the first port 58. Should this biasing force be overcome, so as to cause the piston 38 to compress the main spring 72, the step 49 limits the motion of the piston 38 and prevents the main spring 72 from being overstressed.

Referring again to FIGS. 3-7, the relief valve 50 further includes a second chamber 74 defined in the adapter 54 between the adjuster 56 and the pilot seat 66. A pilot poppet 76 is slideably disposed in the second chamber 74. The pilot poppet 76 has a ball seal 78. A pilot spring 80 is disposed in the second chamber 74, and is in contact with both the pilot poppet 76 and the adjuster 56. The pilot spring 80 biases the pilot poppet 76 toward the orifice 68 of the pilot seat 66, so that, when the force created by the fluid pressure at the orifice is less than the force provided by the pilot spring 80, the ball seal 78 abuts the orifice 68. The adjuster 56 can be adjusted to move closer or farther away from the pilot poppet 76, thereby increasing or decreasing the biasing force of the pilot spring 80. The dimensions of the ball seal 78 are appropriate for preventing the flow of fluid through the orifice 68. A passageway 82 is defined between the inner surface of the adapter 54 and the outer surface of the cage 52, and provides communication between the second chamber 74 and the second port 60.

Figure 6:
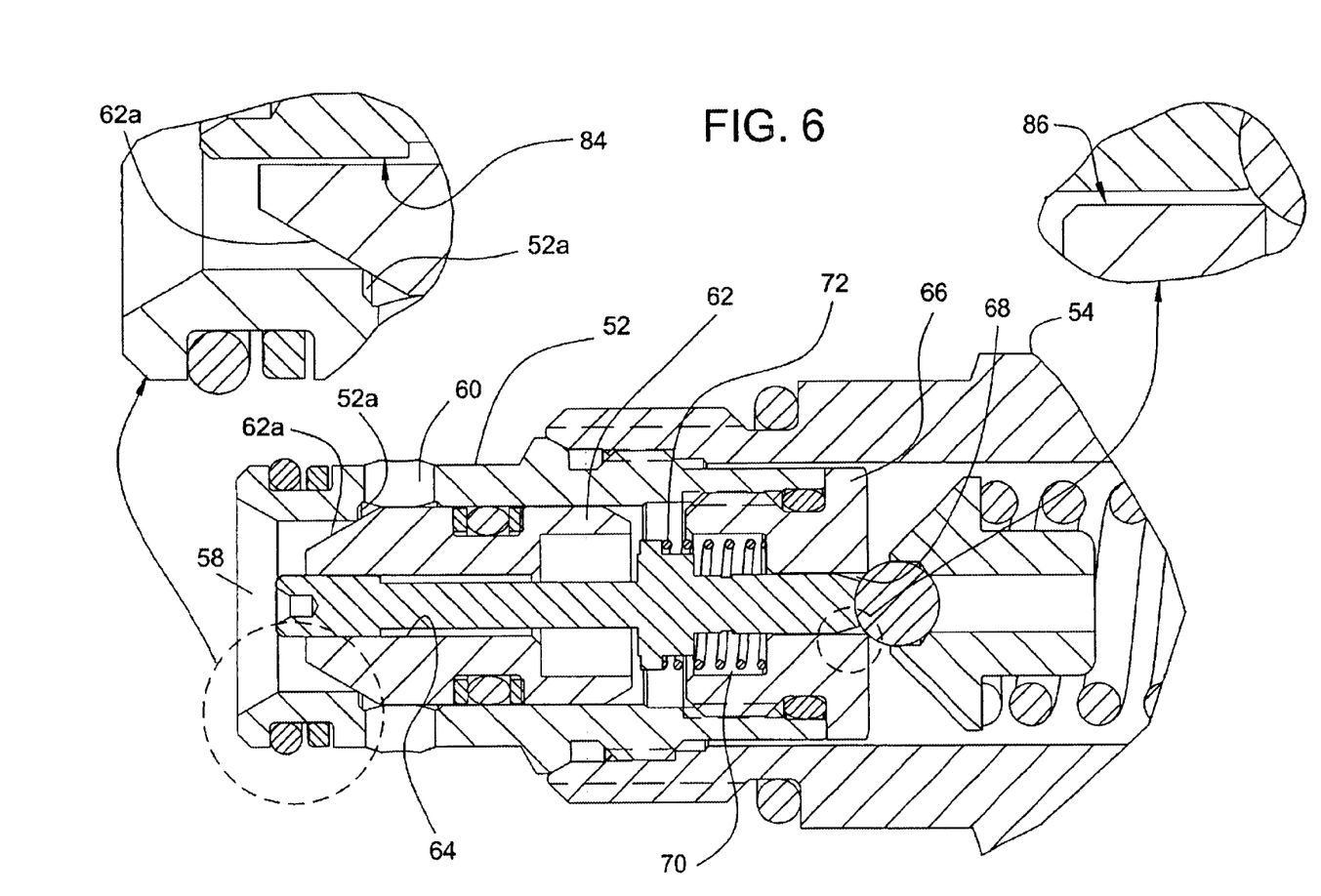
Figure 7:
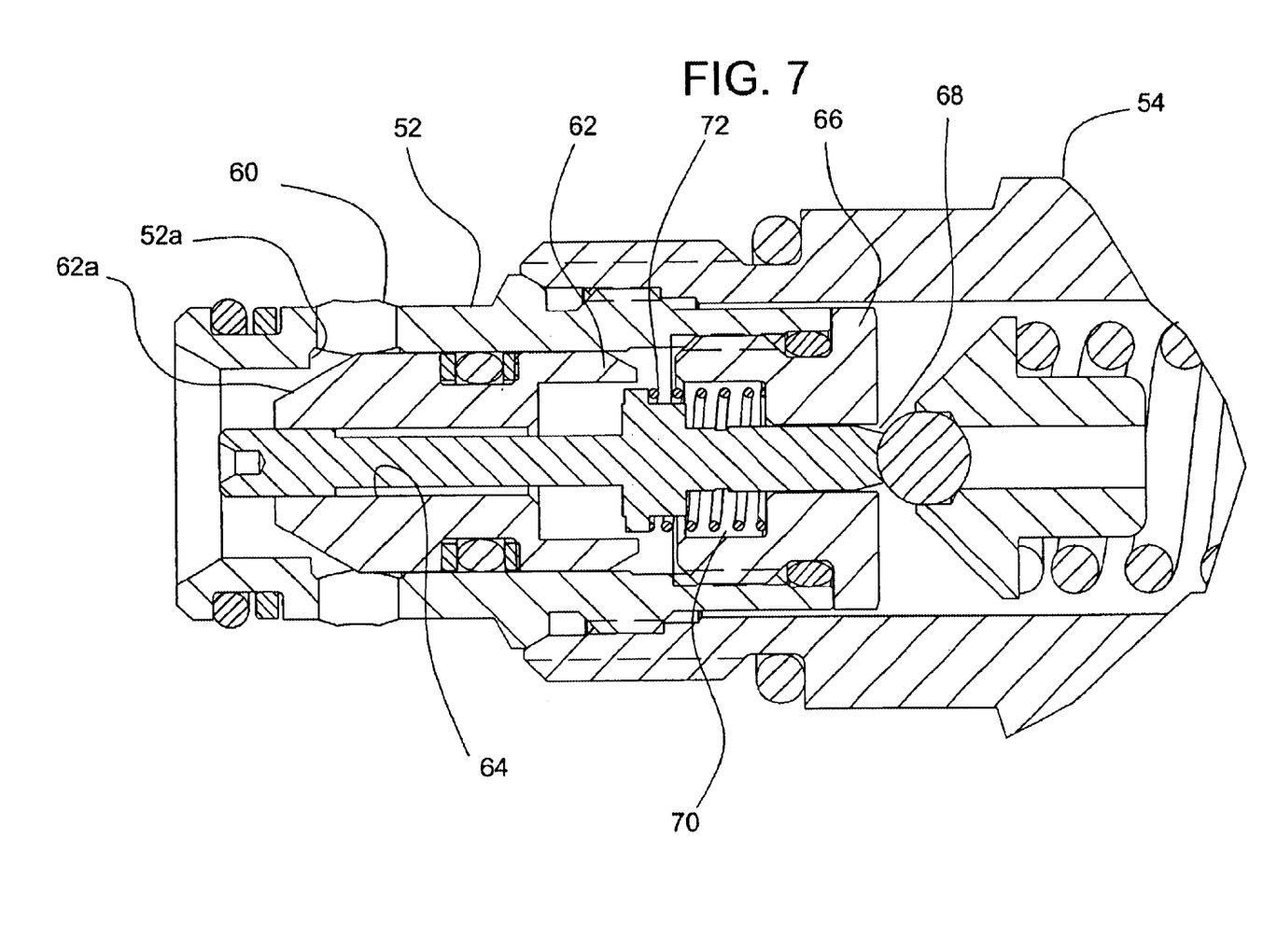

In accordance with an embodiment of the invention, an example of how the relief valve 50 of FIGS. 3-7 operates will now be described. In this example, it is assumed that the piston 38 is initially in the first position, as shown in FIGS. 3 and 4, in which the first port 58 is in fluidic communication with the first chamber 70 via the slots 46 of the piston 38. It is also assumed that the main poppet 62 is initially in the position depicted in FIGS. 3 and 4, in which it prevents any communication between the first port 58 and the second port 60. It is further assumed that a pressure spike has occurred at the first port 58 and quickly propagates into the first chamber 70 through the slots 46. As a result, the pressure in the first chamber 70 increases sufficiently to force the pilot poppet 76 away from the orifice 68, thereby unblocking the orifice 68. Fluid then flows from the first chamber 70, through the orifice 68, through the second chamber 74, through the passageway 82 and out of the second port 60. This movement of fluid causes the pressure in the first chamber 70 to drop. The resulting differential pressure between the first port 58 and the first chamber 70 causes the piston 38 to move toward the orifice 68 until it moves into a position in which the leading edge 47 of the slot 46 enters the bore 64 of the poppet 62. This creates a first restriction on the pilot flow between the main poppet 62 and the stem 40 of the piston 38. The first restriction limits the flow of fluid from the first port 58 to the first chamber 70, thereby causing the pressure in the first chamber 70 to drop quickly and, as a result, causing the main poppet 62 to move toward the pilot seat 66. This opens a flow passage between the face 62a of the main poppet 62 and the seat 52a of the cage 52, thereby permitting fluid to flow from the first port 58 directly to the second port 60. Furthermore, the piston 38 moves toward the pilot seat 66, as shown in FIG. 6. This process repeats itself until the second stem 41 of the piston 38 enters the orifice 68. At that point, there a second clearance is created between the wall of the orifice 68 and the second stem 41. FIG. 6 shows the configuration of the valve at this point, and depicts the first restriction (reference numeral 84) and the second restriction (reference numeral 86). Ultimately, the piston 38 moves far enough into the orifice 68 as to make contact with the ball seal 78 and to keep the orifice 68 unblocked, as shown in FIG. 7.

Figure 8:
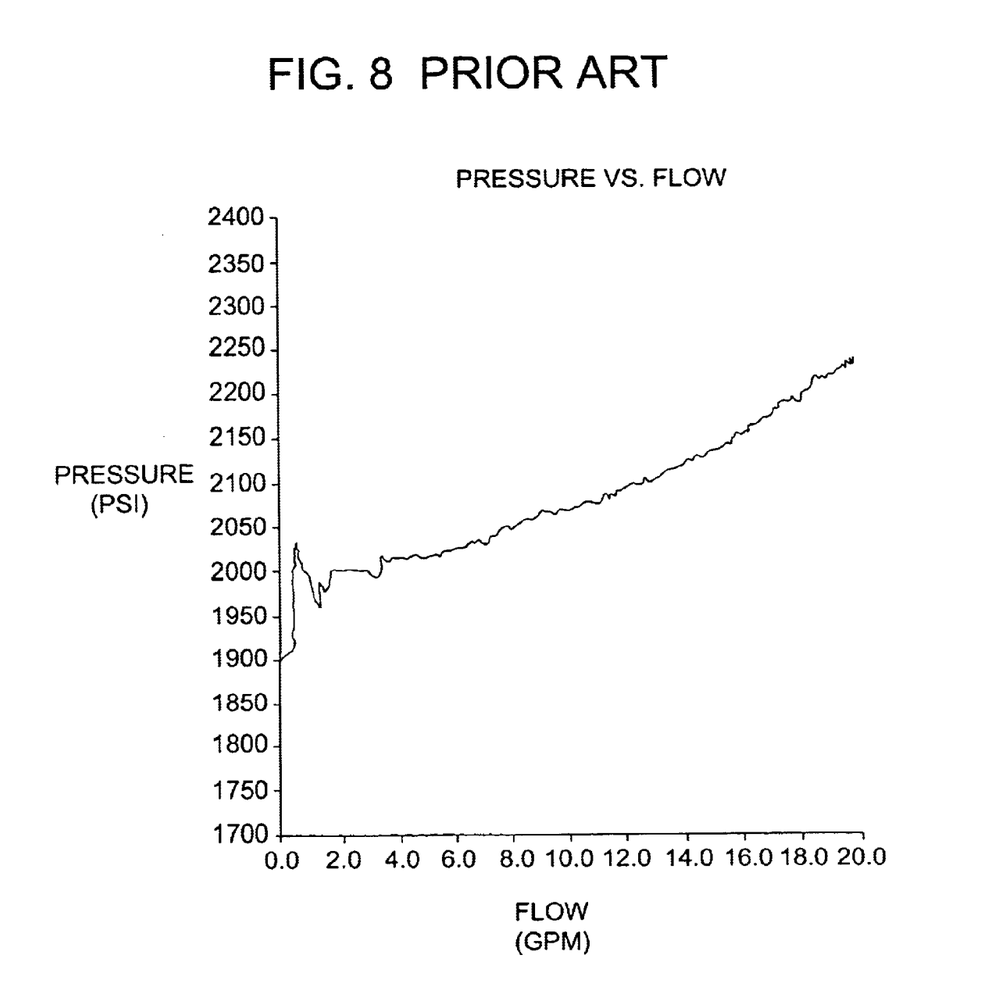
FIG. 8 illustrates the flow characteristics of the prior art relief valve of FIG. 1.
Figure 9:
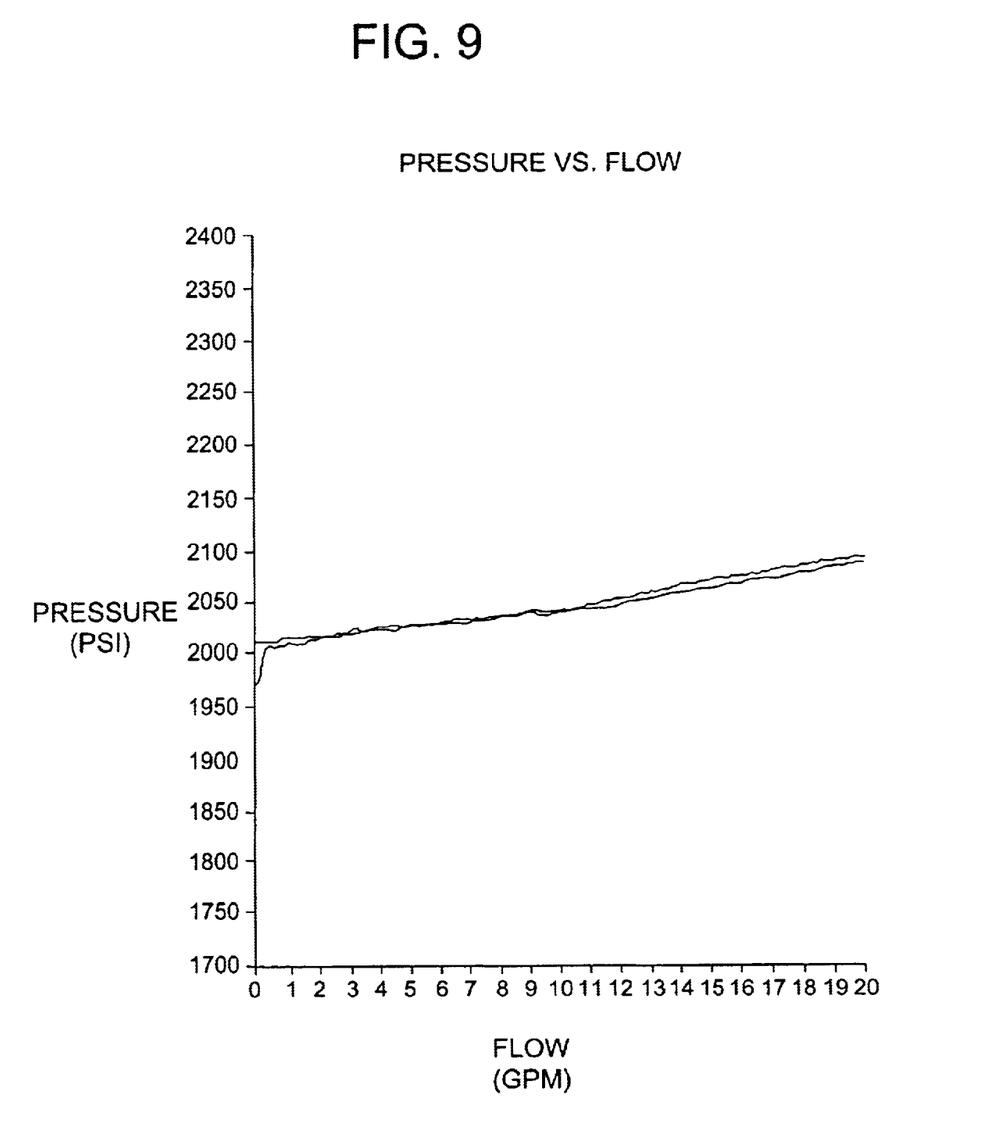
FIG. 9 illustrates the flow characteristics of an embodiment of the invention.

At this point, the pilot flow (the flow of fluid from the first chamber 70 to the second chamber 74) is restricted, and is controlled by the movement of the main poppet 62. Furthermore, the main poppet 62 now follows the movements of the piston 38. The main poppet 62 now throttles the passage of fluid between the cage seat 52a and the face 62 of the main poppet. This allows the relief valve 50 to have a smooth response and consistent performance compared to the prior art relief valve 10 of FIG. 1. This can be seen by comparing FIG. 8, which illustrates the performance characteristics of a prior art valve such as the one illustrated in FIG. 1, with FIG. 9, which illustrates the performance characteristics of an embodiment of the invention.

Additionally, the relief valve shown in FIGS. 3-9 and described herein reduces the working stress on pilot spring or, alternatively, increases the maximum possible pressure setting compared to the prior art relief valve of FIG. 1. This is due to the fact that, for a given size valve, the diameter of the piston is smaller than the diameter of the tube that it replaces. The diameter of the pilot seat of the inventive relief valve is also smaller than the diameter of the pilot seat of the prior art valve of FIG. 1. This decrease in diameter results from the fact that the invention uses a solid piston as opposed to the hollow tube of the prior art valve. Thus, wall thickness limitations that were present with the hollow tube no longer apply with the invention.

It can thus be seen that a new and useful cartridge relief valve has been provided. In view of the many possible embodiments to which the principles of this invention may be applied, it should be recognized that the embodiments described herein with respect to the drawing figure is meant to be illustrative only and should not be taken as limiting the scope of invention. Therefore, the invention as described herein contemplates all such embodiments as may come within the scope of the following claims and equivalents thereof.

We claim:

1. A relief valve comprising:

a cage having an axial bore;

a moveable member disposed within the axial bore of the cage, the moveable member comprising a first end and a second end, the moveable member having an axial bore extending from the first end to the second end;

a fixed member disposed within the axial bore of the cage adjacent to the second end of the moveable member, a chamber being defined between the moveable member and the fixed member;

a piston disposed within the axial bore of the moveable member and at least partially extending into the chamber, the piston comprising a stem having a slotted section and a non-slotted section, the piston having at least a first position, in which the non-slotted section is outside of the axial bore of the movable member at its first end, and a second position, in which the non-slotted section is at least partially inside the axial bore, wherein, when the piston is in the first position, the relief valve is capable of passing fluid through the axial bore of the movable member, around the slotted section of the piston, and through the chamber, and wherein, in response to a decrease in pressure in the chamber, the piston moves toward the fixed member from the first position to the second position, thereby restricting the flow of the fluid through the axial bore.

2. The relief valve of claim 1, wherein the axial bore of the first moveable member is defined by a wall, wherein a slot is defined in the slotted portion of the stem, wherein the slot and the wall define a channel through which the fluid passes, and wherein when the piston is in the second position, the non-slotted portion and the wall define a clearance that restricts the flow of the fluid into the channel.

* * * * *